United States Patent [19]
Oi

[11] Patent Number: 5,149,008
[45] Date of Patent: Sep. 22, 1992

[54] SPINNING REEL WITH ADJUSTABLE DRAG MEMBER

[75] Inventor: Takeshi Oi, Sakai, Japan

[73] Assignee: Shimano Industrial Co., Ltd., Osaka, Japan

[21] Appl. No.: 631,500

[22] Filed: Dec. 21, 1990

[51] Int. Cl.$^5$ .............................. A01K 89/02
[52] U.S. Cl. ........................ 242/246; 242/319; 242/322
[58] Field of Search ............... 242/243, 244, 246, 319, 242/322

[56] References Cited

U.S. PATENT DOCUMENTS

| | | | |
|---|---|---|---|
| 4,681,276 | 7/1987 | Sato | 242/249 |
| 4,702,431 | 10/1987 | Kaneko | 242/246 |
| 4,804,150 | 2/1989 | Takeuchi | 242/244 X |
| 4,805,849 | 2/1989 | Nanbo | 242/319 |
| 4,911,378 | 3/1990 | Hitomi | 242/246 |

FOREIGN PATENT DOCUMENTS 63-68773  9/1988  Japan.

*Primary Examiner*—Daniel P. Stodola
*Assistant Examiner*—Tony A. Gayoso
*Attorney, Agent, or Firm*—Dickstein, Shapiro & Morin

[57] ABSTRACT

A spinning reel includes a spool rotatably supported by a spool shaft, a drag member for imparting a braking force to rotation of the spool, and an adjusting member for axially pressing the drag member to thereby adjust the braking force. The spool includes a front face and an annular projection projecting from the front face for preventing water from entering the front face to reach the drag member. The adjusting member is provided with an annular groove for receiving the annular projection.

8 Claims, 3 Drawing Sheets

SPINNING REEL WITH ADJUSTABLE DRAG MEMBER

BACKGROUND OF THE INVENTION

1. Field of the Invention

The present invention relates to a spinning reel, and more particularly to a spinning reel comprising a spool rotatably supported by a spool shaft for imparting a braking force to rotation of the spool wherein the braking force is adjustable.

2. Description of the Prior Art

An example of the spinning reels of the above type is shown in Japanese Utility Model Publication No. 52-26469, which generally includes an inner hollow portion in a center portion of a front face of the spool, and a plurality of drag members provided in the inner hollow portion for imparting the braking force to rotation of the spool. To an extreme end of the spool shaft is screwed an adjusting member for adjusting the braking force having a pressing portion for axially pressing the drag members and a larger diameter portion extending radially outwardly of the pressing portion to oppose to the front face of the spool. Rotation of the adjusting member axially presses the drag members thereby to adjust the braking force to be imparted to rotation of the spool. A forwardly projecting front jaw is provided in an outer periphery of a front flange of the spool for guiding a fishing line.

However, the spinning reel, when using as attached to a fishing rod, has the spool positioned close to a tip of the rod relative to a reel body. As a result, when crossing the ocean by boat or fishing on the boat, if the waves or rain splashes on the spinning reel attached to a standing rod, a problem occurs that water is gathered in the front face of the spool and enters the inner hollow portion to wet the drag members. In order to solve this problem, Japanese Utility Model Application "Kokai" No. 63-68773 provides an annular sealing member having a lip portion attached to one of the drag members opposing to the adjusting member thereby to prevent the drag members from getting wet when water splashes on the reel. However, this kind of reel is disadvantageous in that the required elements are inevitably increased in number due to the provision of the sealing member, which results in the complicated structure and high manufacturing cost. Furthermore, the sealing member affects the braking force to a great extent, which does not permit the braking force to be smoothly changed.

The present invention has been made in view of the foregoing drawbacks, and an object thereof is to provide a spinning reel capable of reliably preventing the drag members from getting wet by simply modifying part of the spool and the adjusting member without exerting any baneful influence upon the braking force due to the provision of the anti-wet means.

SUMMARY OF THE INVENTION

In order to achieve the above-noted object, the present invention is characterized by a spinning reel comprising a spool rotatably supported by a spool shaft, a drag member for imparting a braking force to rotation of the spool, and an adjusting member for axially pressing the drag member thereby to adjust the braking force, in which the spool includes a front face and an annular projection projecting from the front face for preventing water from entering the front face to reach the drag member, and the adjusting member is provided with an annular groove for receiving the annular projection projecting from the spool.

Operation and effects of the spinning reel according to the present invention will be described below.

Since there are provided the forwardly extending annular projection for preventing water from entering the drag member from the front face, and the annular groove defined in the adjusting member for receiving the annular projection, water in the front face of the spool cannot enter the drag member when the reel attached to a rod is exposed to the spray of the wave. As a result, the drag member is reliably prevented from getting wet. In addition, since no sealing member is used, undesirable effects on the braking force are avoided by preventing incursion of water.

Further, it is preferable that the annular groove in the adjusting member is loosely engaged with the annular projection in the front face of the spool, that a sealing space forming an annular groove is defined therebetween, and that a front jaw is provided in a forward end portion of the spool so that the projecting height of the annular projection of the front face of the spool is greater than the height of the front jaw of the spool. More particularly, the sealing space can be defined between the annular projection and the annular groove without using any sealing member. The space may have a substantially U-shaped cross section through which water can flow in only a roundabout stepwise way. This prevents water from entering the drag member. That is, a labyrinthine effect can be obtained by a bypass defined by the sealing space thereby to effectively prevent water in the front face of the spool from entering the drag member. Even when a large amount of water is gathered in the front face of the spool, it is possible to discharge standing water over the front jaw before climbing over the annular projection, and thus it is advantageous for preventing incursion of water more effectively.

It is also advantageous if a drain port or drain ports radially extend through a forward end portion of the spool, and/or axially extend through a trunk of the spool from the front face to a rear face.

With such a structure, water standing in the front face of the spool can be drained out, which ensures more effective prevention of incursion of water into the drag member.

Therefore, according to the present invention, when the waves are sprayed on the spinning reel attached to the rod, the reel can reliably prevent water gathered in the front face of the spool from entering the drag member. Further, the braking force can be smoothly changed while preventing the drag member from getting wet. Still further, since no sealing member is used, the prevention of incursion of water does not negatively affect the braking force.

In addition, since it is sufficient to simply modify only part of the spool and the adjusting member in the common spinning reel having the drag member for imparting the braking force to rotation of the spool, and the adjusting member for adjusting the braking force, the relatively low manufacturing cost is realized.

Other objects, features and advantages of the present invention will be apparent from the following description referring to the accompanying drawings.

DETAILED DESCRIPTION OF THE PREFERRED EMBODIMENTS

The present invention will be described in detail hereinafter in reference to the accompanying drawings.

Figure 5:
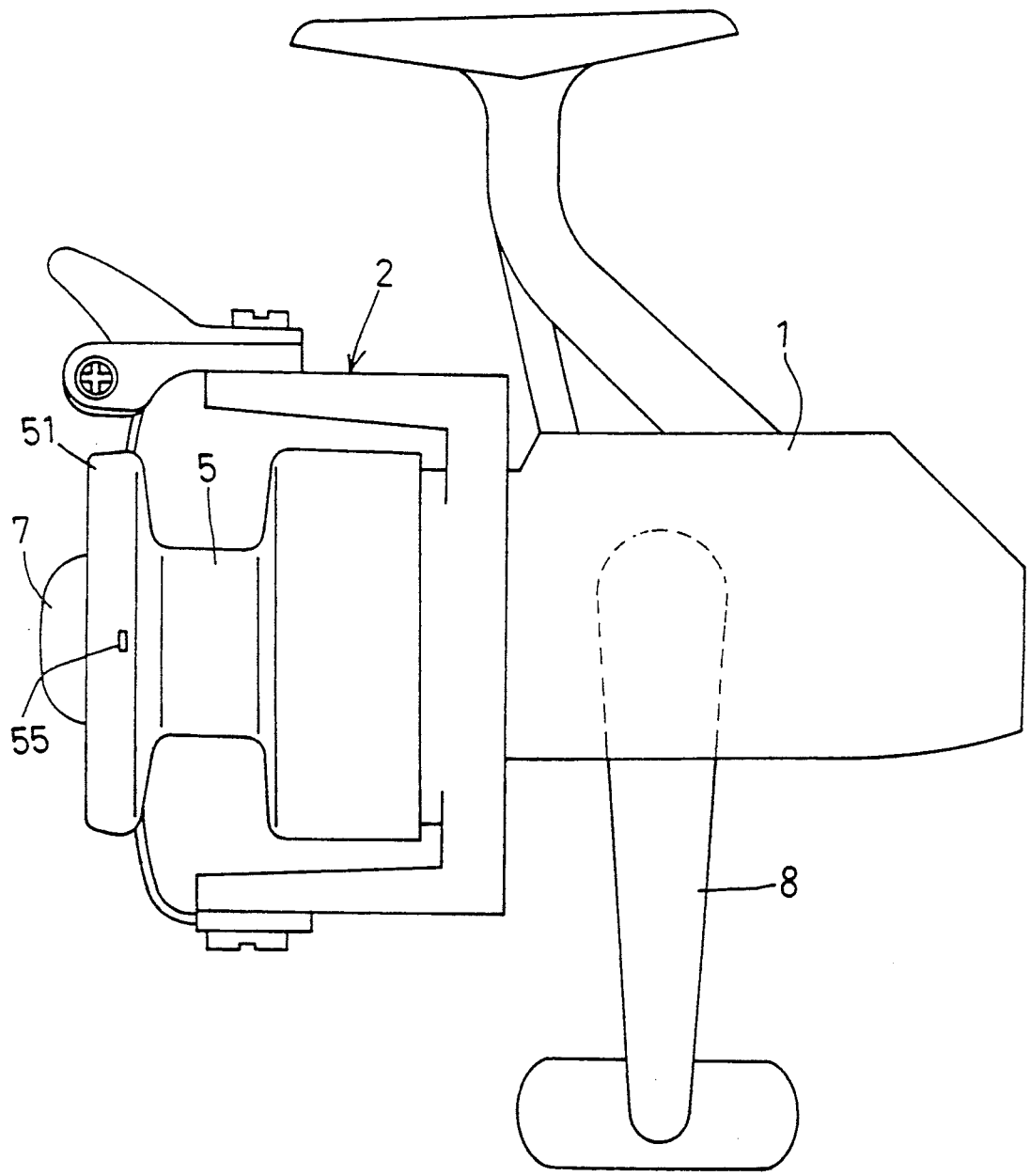
FIG. 5 is a side view of the entire reel.

FIG. 5 shows a spinning reel according to the present invention which comprises a hollow reel body 1 provided with a pole mount in an upper portion thereof and a perforation in a front portion thereof, and a rotary frame 2 provided with a bail arm rotatably supported in the perforation through a drive sleeve shaft. A spool shaft 3 is axially supported to be unrotatable. A spool 5 having a front jaw 51 is rotatably supported by the spool shaft 3 so that axial movement of the spool 5 is regulated by a stopper 4. The spool 5 defines an inner hollow portion 52 including a drag member having a plurality of braking members provided therein for imparting a braking force to rotation of the spool 5. To an extreme end of the spool shaft 3 is screwed an adjusting member 7 for adjusting the braking force. The adjusting member 7 includes a pressing portion 71 for axially pressing the drag member 6, and a large diameter portion 72 extending radially outwardly of the pressing portion to oppose to a front face 53 of the spool 5. A handle 8 is rotatably supported by a side portion of the reel body 1 through a handle shaft. Rotation of the handle 8 permits the rotary frame 2 to rotate through a drive mechanism. The spool shaft 3 is axially moved through a reciprocation mechanism to wind up a fishing line to the spool 5. The adjusting member 7 is rotated to move relative to the spool shaft 3 and press the drag member 6 thereby to adjust the braking force imparted to the spool 5.

The drag member 6 includes a disc-shaped braking member 61 unrotatable and axially movable relative to the spool shaft 3, and a disc-shaped braking member 62 unrotatable and axially movable relative to the spool 5. Contact plates 63 are disposed between the braking member 61 for the spool shaft and the braking member 62 for the spool, and between the braking member 61 for the spool shaft and a rear wall of the inner hollow portion 52, respectively.

At the front face 53 of the spool is provided an annular projection 54 extending forwardly for preventing water from entering the drag member 6 from the front face 53. The adjusting member 7 defines an annular groove 73 for receiving the annular projection 54.

Thus, if the spray of the waves dashes against the reel attached to a standing rod when crossing the ocean by boat or fishing on the boat, water gathered in the front face 53 of the spool is reliably shut off from the inner hollow portion 52 by an outer face of the annular projection 54. This prevents the drag member 6 provided in the inner hole 52 from getting wet. In addition, since no sealing member is used, there is no problem such that the braking force cannot be smoothly changed resulting from prevention of the wet drag member.

Figure 1:
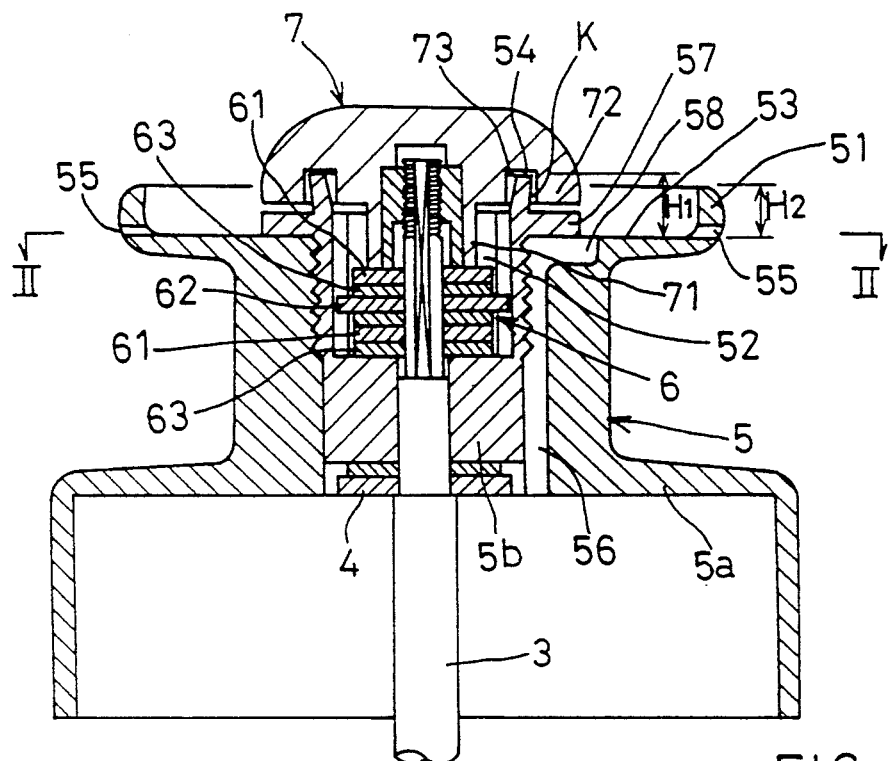
FIG. 1 is a fragmentary enlarged sectional view showing a spinning reel embodying the present invention.
Figure 2:
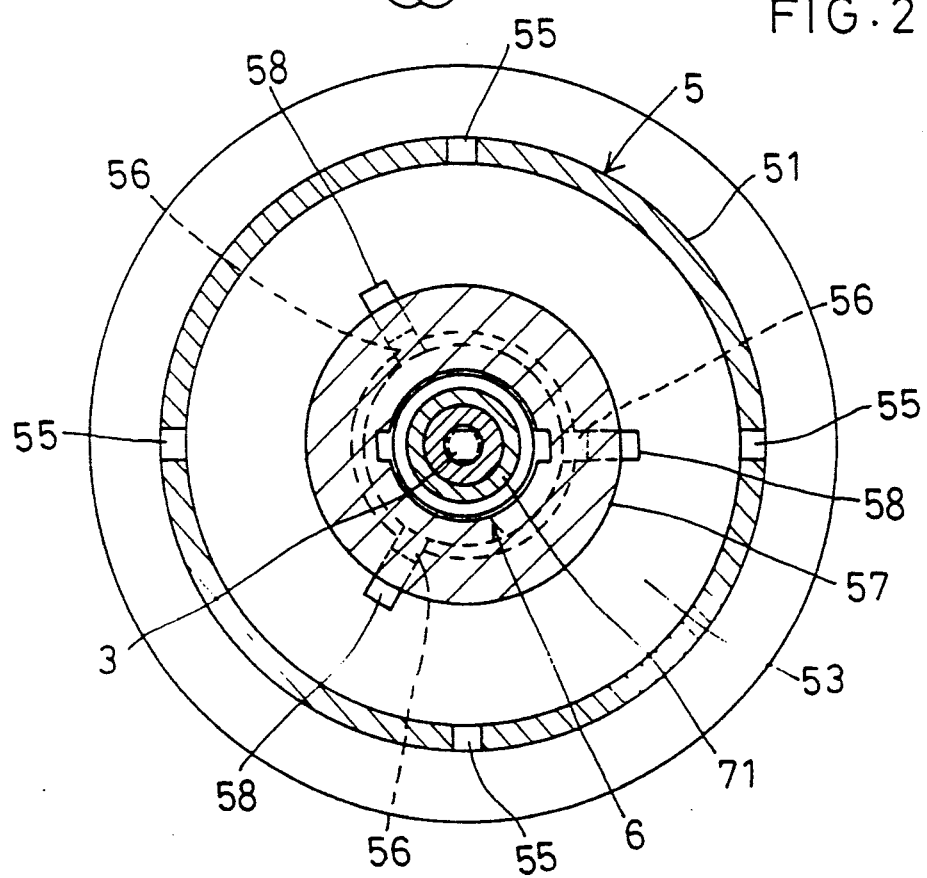
FIG. 2 is a section taken along a line II—II of FIG. 1.

According to FIGS. 1 and 2, the annular projection 54 is loosely engaged with the annular groove 73 of the adjusting member 7. A sealing space K is defined between an inner face of the annular groove 73 and the annular projection 54. Engagement between the annular groove 73 and the annular projection 54 defines a bypass toward a rotational center line of the spool 5. The sealing space K has a substantially U-shaped cross section, along which water flows and is effectively prevented from entering the inner hollow portion 52 stepwise thereby to avoid wetting the braking member 6. The annular projection 54 is inclined from a proximal end toward a distal end to have a larger diameter. As a result, water shut off at the outer face of the annular projection 54 is more unlikely to climb over the annular projection 54.

It is preferable to define a projecting height H1 of the annular projection 54 to be greater than a height H2 of the front jaw 51 of the spool so that even a large amount of water gathered at the front face (i.e., within the concavity formed by the projection 54, the face 53 and the jaw 51) flows over the front jaw 51 prior to climbing over the annular projection 54.

As shown in FIG. 1, a plurality of drain ports 55 extend radially through the front jaw 51 at a lower level than the annular projection 54. Water in the front face 53 of the spool is positively discharged through the ports 55. The illustrated embodiment also has a plurality of drain ports 56 axially extending through a trunk of the spool 5 from the front face 53 to a rear face. In an alternative embodiment (not illustrated), only the drain ports 56 are provided.

In FIGS. 1 and 2, the spool 5 comprises a spool body 5a having a tubular winding-up trunk and front and rear flanges, and a sleeve 5b screwed to an inner periphery of the winding-up trunk of the spool body 5a. From a front portion of the sleeve 5b of the spool 5 is projected a flange 57 having a diameter larger than that of the annular projection 54 and substantially the same as an outer diameter of the larger diameter portion 72. The plurality of drain ports 56 extending from the front to the rear are peripherally spaced in a predetermined distance in the inner periphery of the spool body 5a. A recess 58 is defined extending radially outwardly of a forward end portion of each drain port 56 to open at a position outwardly of the flange 57. Water in the front face 53 is received by an outer face of the flange 57 to be directed to the recess 58. Subsequently, water in the recess 58 flows rearwardly along the spool 5 through the drain ports 56 thereby to be drained out of a space between the spool 5 and the rotary frame 2.

Figure 3:
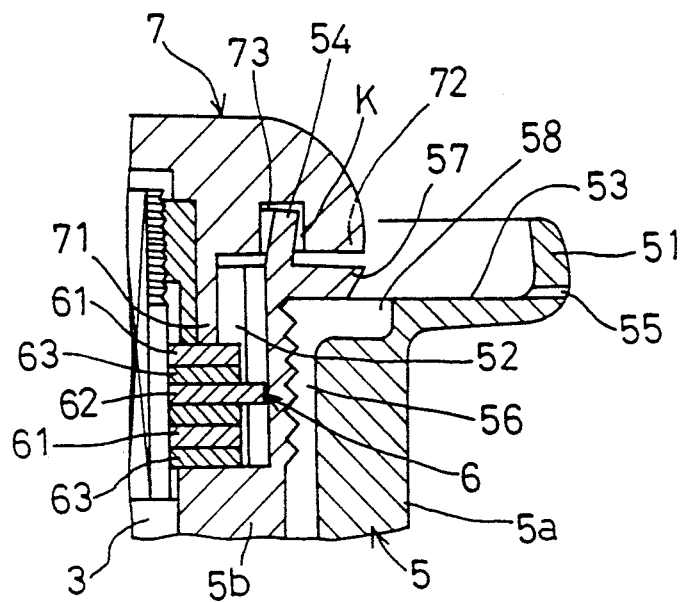
FIG. 3 is a fragmentary sectional view showing another embodiment of the present invention.

As shown in FIG. 3, the flange 57 may have an outer face thereof cut annularly so as to be tapered from the adjusting member 7 toward the recess 58.

The drain ports 56 may be defined so as to extend through the winding-up trunk of the spool body 5a from the opened portion of the recess 58 positioned outwardly of the flange.

Figure 4:
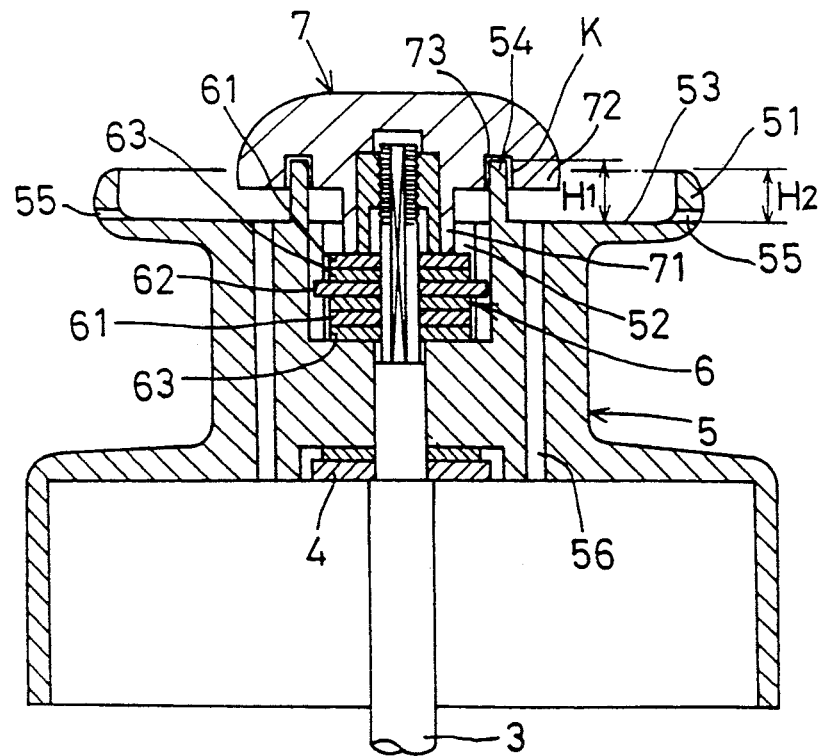
FIG. 4 is a fragmentary sectional view showing a further embodiment of the present invention.

As seen from FIG. 4, the spool 5 may have the spool body 5a and the sleeve 5b integrally formed with each other.

What is claimed is:

1. A spinning reel comprising:
    a spool (5) rotatably supported by a spool shaft (3),
    an adjustable drag member (6) for imparting a braking force to rotation of the spool (5), and
    an adjusting member (7) for axially pressing the drag member (6) to thereby adjust the braking force, wherein the spool (5) includes a front face (53), a rear face, and a trunk which is located between the front face and the rear face, said front face (53) having an outer periphery, wherein the spool (5) further includes an annular projection (54) projecting forwardly of the front face (53) for preventing water from entering the front face to reach the drag member (6), wherein the spool (5) further includes a front jaw (51), said front jaw (51) being located at the outer periphery of the front face (53), and wherein the annular projection (54), the front face (53) and the front jaw (51) form a concavity, wherein the spool (5) further includes at least one drain port (56) axially extending through the trunk from the concavity to the rear face, and wherein the adjusting member (7) is provided with an annular groove (73), and wherein the annular projection (54) is received within the annular groove (73) to form a labyrinthine seal for preventing water from reaching the adjustable drag member (6).

2. A spinning reel as claimed in claim 1 wherein the annular groove (73) of the adjusting member (7) is loosely engaged with the annular projection (54).

3. A spinning reel as claimed in claim 1 wherein the annular projection (54) has a height greater than the height of the front jaw (51).

4. A spinning reel as claimed in claim 3 wherein the front jaw (51) is provided with a drain port (55) radially extending through the front jaw.

5. A spinning reel as claimed in claim 1 further comprising a flange (57) extending radially outwardly of a front end portion of the drain port (56), the flange (57) having an outer face and an inner face, said outer face being adjacent to the adjusting member (7), wherein the flange (57) is cut annularly such that the inner face has a smaller diameter than the outer face.

6. A spinning reel as claimed in claim 1 wherein the spool (5) includes a spool body (5a) having front and rear flanges, and wherein the trunk is a winding-up trunk and wherein the winding-up trunk is an element of the spool body (5a), and wherein the spool (5) further includes a sleeve (5b) having an inner hollow portion (52), the sleeve (5b) being screwed to an inner periphery of the winding-up trunk of the spool body 5(a), the spool body and the sleeve being formed separately.

7. A spinning reel as claimed in claim 1 wherein the spool (5) includes a spool body (5a) and a sleeve (5b) integrally formed with each other.

8. A spinning reel as claimed in claim 1, wherein the spool (5) includes a second drain port (56) axially extending through the trunk from the front face (53) to the rear face.

* * * * *